Oct. 13, 1931.  F. EHRENHAFT  1,826,754
METHOD OF AND APPARATUS FOR MAKING PHOTOPHONOGRAPHIC RECORDS
Filed Oct. 1, 1928
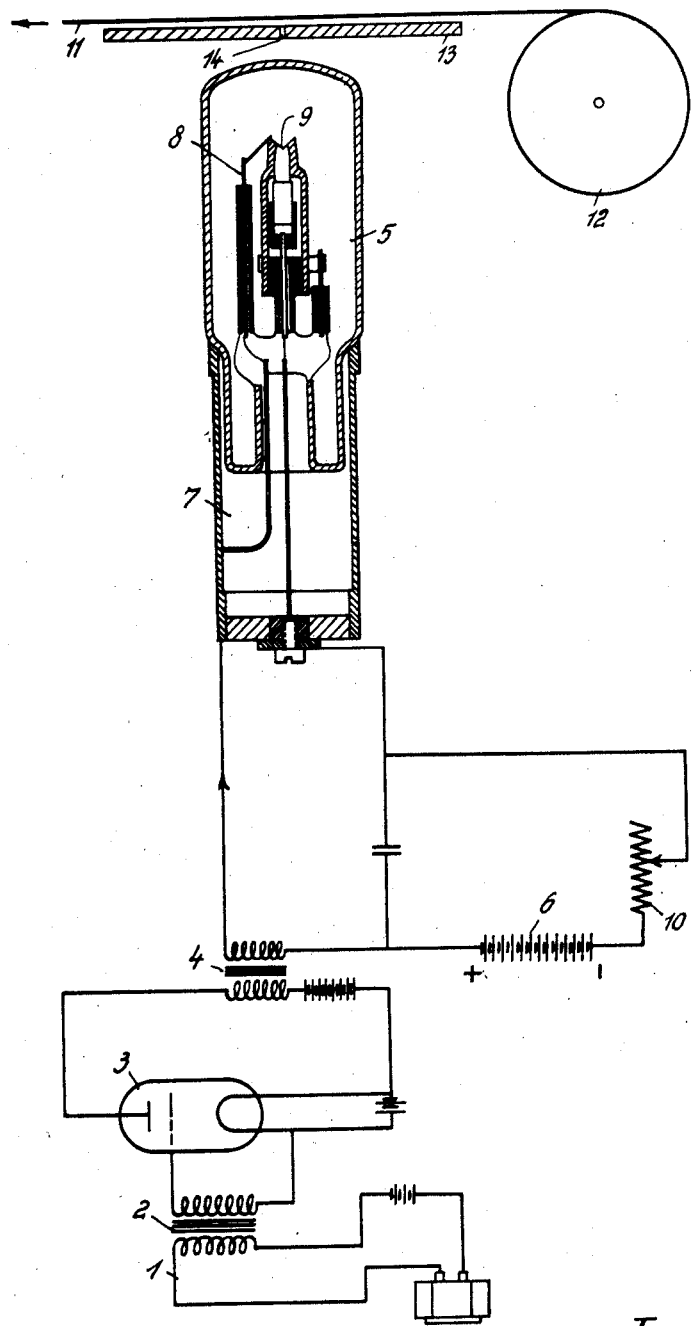
Inventor:
Franz Ehrenhaft
by [signature]
Atty.

Patented Oct. 13, 1931

1,826,754

UNITED STATES PATENT OFFICE

FRANZ EHRENHAFT, OF BERLIN-LICHTENBERG, GERMANY

METHOD OF AND APPARATUS FOR MAKING PHOTOPHONOGRAPHIC RECORDS

Application filed October 1, 1928, Serial No. 309,674, and in Germany October 1, 1927.

This invention relates to a method of and apparatus for making photo-phonographic records by means of electrical devices which are able to produce light discharges acting upon a light-sensitive layer, such as a film which forms the carrier of the photo-phonographic record.

It is well known to use sources of light which are controlled by sound-waves in order to make photo-phonographic records. Principally, there are two possibilities of controlling light discharges for this purpose, viz: in the first place a constant source of light may be modulated as to its action upon the sensitive layer for the photo-phonographic record, or in the second place, the emission of light itself from the source may be controlled in accordance with the sound-waves. According to my invention the latter mode of controlling light discharges is employed.

In order to solve the problem underlying my present invention, various schemes have been proposed. All propositions so far made, however, are connected with certain disadvantages which are entirely avoided by my present invention. The two principal solutions which have been proposed for the present purpose consist, firstly, in using so-called glow discharges as proposed by Gehrke, and secondly, in using arc-discharges according to the early work of Ruhmer. According to my invention, now, a special form of discharge is used which is a transitional form of a glow discharge and an arc-discharge. The discharge which is used according to my invention, although being a transitional form of discharge, may well be termed a glow discharge, though not of Geissler's type.

When using glow discharges for producing photo-phonographic records, the disadvantage arises, that the quantities of light which are at disposal are generally not sufficient in order to properly blacken the light-sensitive layer in order to produce the photo- phonographic record. This is due to the short time of exposure necessary for the present purpose. The said disadvantage consists therein that a glow discharge by reason of the cold cathode which is a characteristic feature of this kind of discharge does not generate an appreciable discharge of electrons due to thermionic action. On the other hand the glow discharge is connected with the advantage of being an independent electrical discharge.

In the arc-discharge which had been proposed for the present purpose, there are likewise space-charges present intermediate the electrodes; in general the arc-discharge is characterized by the fact that the cathode is heated up to the point of evaporation. It is known since a long time that for the present purpose only a limited number of specific arc-producing devices come into consideration. More particularly, only arc-producing devices may be used for the present purpose in which the evaporated metal again deposits upon the cathode, thus giving off the gas-particles which had previously been absorbed by the metal particles. It may be noted that only in this way it will be possible to practically maintain constancy of the contents of gas as well as of the discharge.

However, even this specific kind of arc-discharges which may most advantageously be generated by means of a mercury vapor lamp, does not permit to maintain constancy of the arc to the extent required for the purpose of producing photo-phonographic records. Besides, in case of arc-discharges there will always be disturbing noises which have a disagreeable effect upon the faithful and enjoyable reproduction of the photo-phonographic record. On the other hand, the arc-discharge has without doubt the advantage that it will produce a greater brilliancy of the light and in consequence thereof greater contrasts in the photo-phonographic records. Also, when using an arc-discharge it will be possible to shorten the time of exposure, or what is the same to increase the velocity of motion of the film-band or other carrier of the photo-phonographic record.

By carefully studying the conditions underlying the principles of producing photo-phonographic records by electrical light discharges I have found that it will be most advantageous to use a form of discharge, which although similar to the glow discharge as regards its mode of generation is different from a discharge of this character as regards its mode of operation. This difference of the form of discharge which I use according to my invention is due to certain characteristic properties of the cathode, which properties do no more characterize the discharge as a glow discharge.

In order to produce photo-phonographic records I naturally use an electrically controlled luminescent gas-discharge in which space-charges are present intermediate the electrodes, and which may be generated by means of electrodes consisting of any desired materials.

The impressed voltage will at first produce a glow discharge. On account of the heat imparted to the electrodes, especially to the cathode, during passage of current there will be produced an increased thermionic effect. The electron-emitting properties which are inherent to many substances when being even moderately heated, have heretofore never been considered for the present purpose, in spite of the special effect which is produced by these properties. It may be noted that the electron emission produced by thermionic action will increase the discharge by the effect of shock-ionization in such a manner, that the discharge will assume a character which can no more be defined by any of the heretofore known definitions.

The glow discharge which I use according to my present invention, now forms part of the class of independent discharges, while the arc-discharge as known is not an independent discharge. According to my invention, therefore, a modified or transitional form of discharge is brought about by a glow discharge, said modified or transitional discharge being characterized by an increased emission of light.

In the accompanying drawing I have shown in a diagrammatical way an example of the devices and their electrical connections which serve for carrying my invention into effect.

From the microphone circuit 1 the electrical current impulses are transmitted by way of a transformer 2 to the amplifying tube 3, whence said impulses are further transmitted by way of another transformer 4 to the lamp circuit. The lamp 5 which serves for producing the photo-phonographich record is supplied with current from a battery 6, a voltage of about 500 to 700 volts being impressed on said lamp, the operating current amounting ordinarily to from 30–35 milli-amperes. The lamp 5 is mounted in a lamp-socket 7. Within the bulb of the lamp 5 there is provided an anode 8 which, for instance, may consist of a tungsten point and a cathode 9, for instance, in the form of a small cylinder. The film-band 11 is rolled off from its carrier 12 and moved past the lamp 5, a shield 13 with a slot 14 therein being interposed between the lamp and the film-band.

By means of a regulating resistance 10 of high resistance value the passage of current through the lamp 5 may be regulated to a value about from 30 to 35 milli-amperes, at which value of current the form of discharge will be stablized and an unstable arc prevented.

The lamp 5 is preferably filled with nitrogen having a pressure of about 30 mm. mercury column. However, also other gases may be used in the lamp at pressures differing from the aforementioned pressure. Although the nitrogen will become luminescent during operation of the lamp and create the impression of a glow discharge, an arc-discharge will be present which besides the luminescence of the nitrogen is characterized by evaporation of the cathode. The electrical discharge taking place in the lamp is a typical transitional form of discharge which is intermediate a glow discharge and an arc-discharge, as had, for instance been described by Compton, Seeliger and others. The conditions which are characteristic for the production of this transitional form of discharge consist in general in the use of a regulating resistance of a high resistance value in connection with a current source of high electromotive force. In this case the current strength is artificially kept within certain limits above a stable glow discharge. The incandescence of the cathode is essential for the practical production of the transitional form of discharge which I use according to my invention and is not a mere incidental feature of said transitional discharge.

I claim:

1. The method of making photo-phonographic records by means of a luminescent gas-discharge controlled by sound-waves, which method consists in transforming said luminescent gas-discharge into a transitional form of discharge intermediate a glow and arc-discharge.

2. The method of making photo-phonographic records by means of a light-source in the form of a luminescent gas-discharge controlled by sound-waves, which method consists in causing an increased thermionic effect to take place in said discharge in operative condition thereof, so as to transform said discharge into a transitional form of discharge intermediate a glow and arc-discharge.

3. The method of producing photo-phonographic records by means of a luminescent discharge controlled by sound-waves, which method consists in supplying operating current controlled by said sound-waves to said luminescent discharge, and regulating the value of said operating current to produce an increased thermo-ionization of said discharge so as to transform the latter during operation into a transitional form of glow and arc-discharge.

In testimony whereof I affix my signature.

FRANZ EHRENHAFT.